Figure 1:
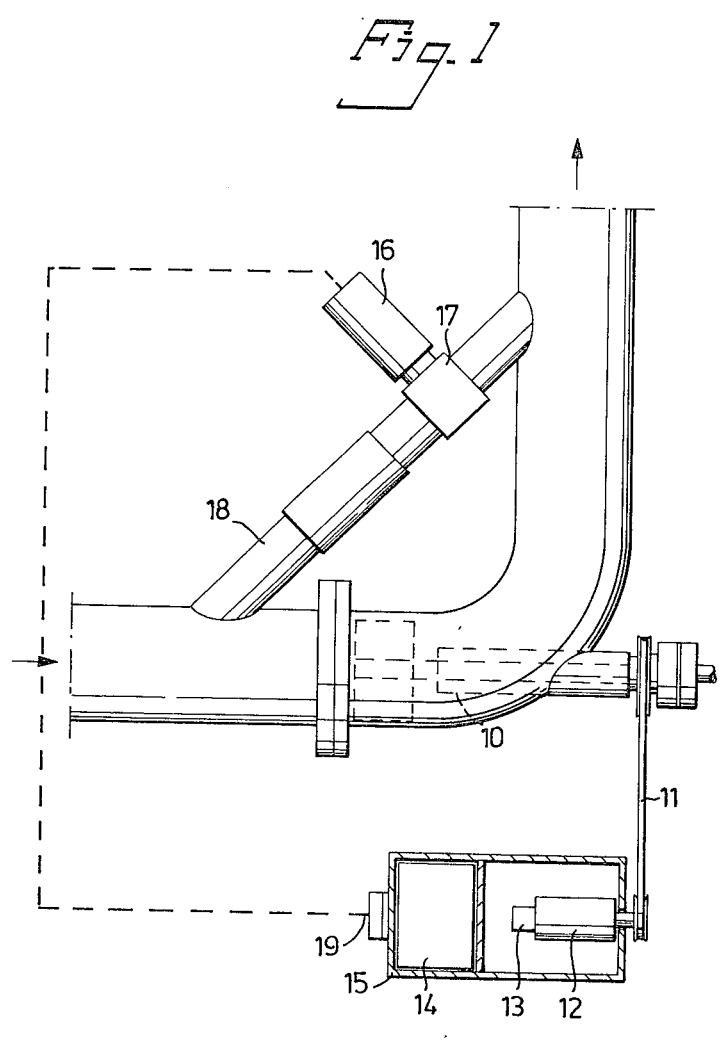

United States Patent [19]

Rosenqvist

[11] 4,276,900
[45] Jul. 7, 1981

[54] IRRIGATION DEVICE

[76] Inventor: Lars Rosenqvist, Gringelstad, 290 24 Gärds-Köpinge, Sweden

[21] Appl. No.: 63,083

[22] Filed: Aug. 2, 1979

[51] Int. Cl.³ .................................................. B05B 3/18
[52] U.S. Cl. ............................... 137/355.21; 137/110; 137/355.22; 239/191; 239/197; 242/86.2
[58] Field of Search ........................ 137/355.16, 355.18, 137/355.19, 110, 355.2, 355.21, 355.22; 242/86, 86.2; 239/191, 192, 195–199

[56] References Cited

U.S. PATENT DOCUMENTS

| 3,060,950 | 10/1962 | Hijmans | 137/110 |
| 3,628,731 | 12/1971 | Phillips | 239/191 |
| 3,848,805 | 11/1974 | Courtright | 239/191 |
| 3,972,478 | 8/1976 | Groelz | 137/355.16 |
| 4,003,519 | 1/1977 | Kruse et al. | 239/191 |
| 4,174,809 | 11/1979 | Arlemark | 242/86.2 |
| 4,186,881 | 2/1980 | Long | 137/355.19 |

FOREIGN PATENT DOCUMENTS 7605973 7/1977 Sweden .

Primary Examiner—Martin P. Schwadron
Assistant Examiner—A. Michael Chambers
Attorney, Agent, or Firm—Hammond & Littell, Weissenberger and Muserlian

[57] ABSTRACT

There is disclosed an irrigation device of the type comprising a hose which is adapted to be connected at one end to a water supply point and at the other end to a spraying device, a drum which is rotatable to coil the hose during an irrigation process and a turbine to be connected to the water supply point and attached to said one end of the hose and adapted to actuate the drum to coil up the hose at a speed dependent upon the pressure of water passing from the supply point to the hose. Known irrigation devices of this type have suffered from the drawback that it is difficult to maintain the turbine speed within a narrow desired range therefor. The irrigation device of the invention is additionally provided with a bypass pipe equipped with a flow control valve bypassing the turbine and associated means for controlling the speed at which the hose is being coiled onto the drum.

2 Claims, 2 Drawing Figures

IRRIGATION DEVICE

This invention relates to an irrigation device.

There are already known irrigation devices which comprise a hose installed between a water supply point and a spraying device, a drum which can be rotated to coil up the hose during an irrigation process, and a turbine which is installed between the water supply point and one end of the hose. The turbine is adapted to actuate rotation of the drum, in response to the pressure of water flowing from the supply point to the hose, via a transmission link such that the drum rotates in a direction which rolls up the hose. Such an irrigation device is disclosed in Swedish Published Patent Application No. 394579.

In ideal conditions, reasonably even watering may be obtained with irrigation devices of this known type. However, various factors may affect the speed at which the hose is coiled up. Two such factors are varying water pressure in the hose, and the length of the hose—this length is approximately proportional to the speed at which the hose is coiled up. In each of these cases the speed of the turbine will be affected in one direction or the other. For example, the less hose remains to be coiled up, the higher the speed of the turbine. The practical effect of variations in the speed of winding of the hose is that the amount of water received per unit area may be unevenly distributed over the surface watered.

According to the present invention there is provided an irrigation device, comprising a hose which is adapted to be connected at one end to a water supply point and at the other end to a spraying device, a drum which is rotatable to coil the hose during an irrigation process, a turbine to be connected to the water supply point and attached to said one end of the hose and adapted to actuate the drum to coil up the hose at a speed dependent upon the pressure of water passing from the supply point to the hose, a bypass pipe equipped with a flow control valve bypassing the turbine, means for sensing said speed at which the hose is being coiled onto the drum and producing a corresponding electrical signal, means for comparing said electrical signal with a preset reference signal corresponding to a desired speed of rotation of the drum, and means for opening or closing the valves in response to any difference between the signals such that the pressure of water passing from the supply point to the hose alters and said electrical signal becomes substantially equal to said reference signal.

Preferably the means for opening and closing the flow control valve comprises an electric motor and a generator therefor operably associated with the turbine to be driven thereby.

Preferably the means for sensing the speed at which the hose is being coiled and for producing the corresponding electric signal is a tachometer associated with the generator, and the means for comparing the electrical signal with said preset reference signal is an electronic governor, the governor being connected to the generator and to the electric motor such that, if the speed departs from said desired speed, the electric motor is actuated to open or close the valve.

Alternatively the means for sensing the speed at which the hose is being coiled and for producing the corresponding electric signal may be a sensor for location adjacent the drum and adapted directly to measure said speed, and the means for comparing the electric signal with said preset reference signal may be an electronic governor, the governor being connected to the generator and the electric motor such that if the speed departs from said desired speed, the electric motor is actuated to open or close the valves. In addition, sensor means may be provided for location adjacent the drum and adapted to detect the number of layers of hose on the drum and produce an electrical signal corresponding to starting of a new layer, the sensor means being electrically connected to the governor such that when a new layer of hose is started and new preset reference signal corresponding to a layer desired speed of rotation and thus to a layer turbine speed is used for the comparison for that layer.

An irrigation device of the invention may be modified in that the generator may be connectable to charge a battery, the device further including a current limit relay connected to the generator and connectable to a said battery, the battery being intended to supply power to the governor and to the motor.

Figure 2:
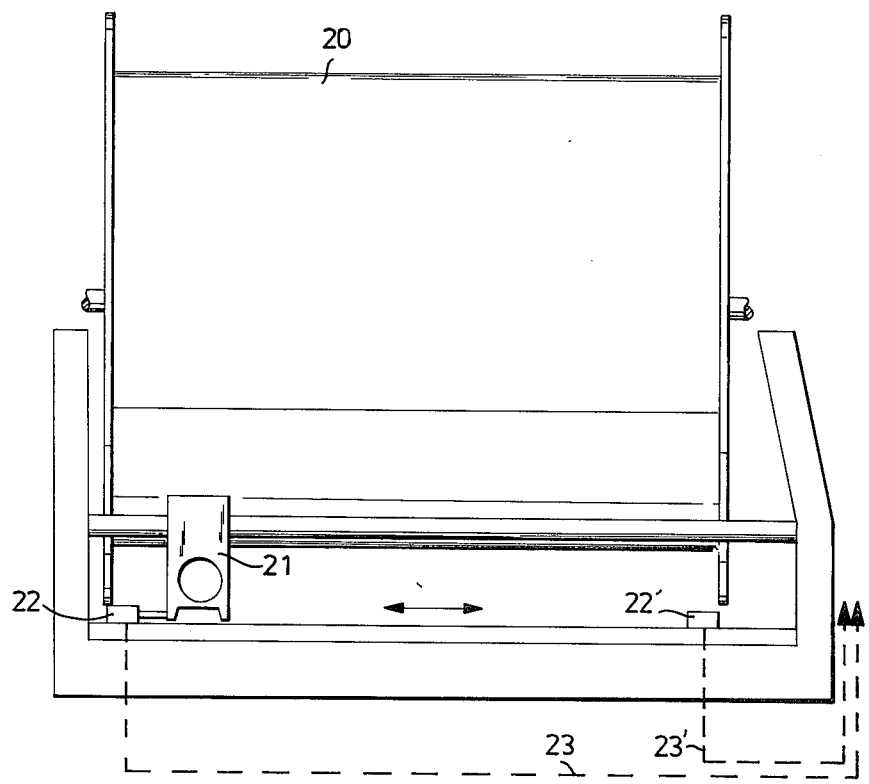

For a better understanding of the present invention and to show how the same may be carried into effect, reference will now be made, by way of example, to the accompanying drawings in which:

FIG. 1 shows a diagrammatic view of part of one form of irrigation device of the invention; and FIG. 2 shows a diagrammatic view of part of a second form of irrigation device of the invention.

In FIG. 1, thee is shown diagrammatically that portion of an irrigation device of the invention connecting the water supply point and one end of the hose. In this connecting conduit, there is shown a turbine 10 connected via a transmission system 11 to a generator 12. A tachometer 13 is mounted on the generator 12, and is electrically connected to an electronic governor 14. The generator 12, the tachometer 13 and the governor 14 are in encased in a housing 15. The part of the connecting conduit containing the turbine 10 is bypassed by a bypass pipe 18 in which is provided a flow control valve 17. Adjustment of this valve may be effected by means of a motor 16, which is in electrical connection with the governor 14.

The device works as follows: the speed of the turbine 10 is sensed by the electronic governor 14 via the tachometer 13, and this speed is compared with a signal indicating a desired turbine speed which is preset in the governor 14. If the speed of the turbine 10, as sensed by the tachometer 13, falls short of or exceeds the desired value by more than a certain preset amount, the governor 14 actuates the motor 16 to open or close the valve 17. If, for example, the valve 17 is opened, a part of the flow of water is diverted past the turbine 10, and the speed of the turbine, and thus the speed at which the hose is being coiled, is reduced.

A different portion of another form of irrigation device of the invention is shown in FIG. 2. A sensor (not shown) is arranged adjacent rotatable drum 20 and is adapted directly to measure the rate at which hose is being coiled onto the drum. The sensor is electrically connected to the governor 14, and an electric signal corresponding to the measured speed is fed to the governor and compared therein with a preset signal corresponding to the desired speed of coiling and thus to the desired turbine speed. The governor regulates the speed of the turbine depending upon this information in the manner previously described. In addition, limit switches 22 and 22' are provided at either end of the drum 20 and are positioned such that moving hose guide 21 comes into contact therewith when a new layer of hose is started on the drum. The limit switches are connected to the governor 14 via conductors 23 and 23'.

The device operates as follows: when a new layer of hose is started on the drum 20, the moving hose guide touches either the limit switch 22 or the limit switch 22' and an electrical signal is produced corresponding to starting of the new layer. This electrical signal is fed to the governor 14 with the effect that when a new layer of hose is started, a new preset reference signal corresponding to a lower desired speed of rotation of the drum and thus to a lower turbine speed is used for the comparison for that layer. When the drum is full, the signal in the governor corresponding to the desired speed of the turbine is automatically returned to the one originally set.

The turbine 10 shown in FIG. 1 is an axial turbine, but this may, of course, be replaced by any other type of turbine which is better suited to the use concerned.

I claim:

1. An irrigation device comprising a hose which is adapted to be connected at one end to a variable water supply means and at the other end to a spraying device, a drum which is rotatable to coil said hose during an irrigation process, a turbine in communication with said water supply means and adapted to rotate said drum to coil up said hose at a speed dependent upon the pressure of water passing from the supply means to said hose, a bypass pipe including a flow control valve such that a portion of said water from said water supply means to said turbine bypasses said turbine through said control valve, means for sensing said speed at which said hose is being coiled onto the drum and producing a corresponding electrical signal, means for comparing said electrical signal with a preset reference signal corresponding to a desired speed of rotation of the drum, means for adjusting the speed of rotation of the drum comprising means for opening and closing the flow control valve comprising an electric motor and a generator therefor, said generator operably connected with said turbine to be driven thereby, said electric motor opening and closing said flow control valve in response to the difference between said signals, whereby said electrical signal becomes substantially equal to said reference signal such that the rotation of said drum substantially corresponds to said desired speed of rotation.

2. An irrigation device as claimed in claim 1, wherein the means for sensing the speed at which the hose is being coiled and for producing the corresponding electrical signal is a tachometer associated with the generator, and the means for comparing the electrical signal with said preset reference signal is an electronic governor.

* * * * *